US012782143B2

(12) United States Patent
Hong

(10) Patent No.: US 12,782,143 B2
(45) Date of Patent: Nov. 3, 2026

(54) PRECISION NAVIGATION DEVICE FOR UAM ROUTE, AND OPERATION METHOD OF PRECISION NAVIGATION DEVICE

(71) Applicant: KOREA AIRPORTS CORPORATION, Seoul (KR)

(72) Inventor: Jin Young Hong, Seoul (KR)

(73) Assignee: KOREA AIRPORTS CORPORATION, Seoul (KR)

( * ) Notice: Subject to any disclaimer, the term of this patent is extended or adjusted under 35 U.S.C. 154(b) by 70 days.

(21) Appl. No.: 18/712,031

(22) PCT Filed: Apr. 21, 2022

(86) PCT No.: PCT/KR2022/005683
§ 371 (c)(1),
(2) Date: May 21, 2024

(87) PCT Pub. No.: WO2023/195571
PCT Pub. Date: Oct. 12, 2023

(65) Prior Publication Data

US 2025/0027775 A1 Jan. 23, 2025

(30) Foreign Application Priority Data

Apr. 6, 2022 (KR) ........................ 10-2022-0042943

(51) Int. Cl.
*G01C 21/20* (2006.01)

(52) U.S. Cl.
CPC .................................... *G01C 21/20* (2013.01)

(58) Field of Classification Search
CPC .......... G01C 21/20; G01C 21/24; G08G 5/54; G08G 5/22; G08G 5/26; G08G 5/32;
(Continued)

(56) References Cited

U.S. PATENT DOCUMENTS 6,239,745 B1 * 5/2001 Stratton ................ G01S 19/393
342/410
2008/0103644 A1 * 5/2008 Oberg ..................... G01S 19/39
342/357.53

(Continued)

FOREIGN PATENT DOCUMENTS

JP 2639367 B2 8/1997
JP H10160812 A * 6/1998

(Continued)

OTHER PUBLICATIONS

Machine translation for WO2022019432A1, Jan. 27, 2022, Hong Jin Young.*

(Continued)

*Primary Examiner* — Abdalla A Khaled
(74) *Attorney, Agent, or Firm* — Studebaker Brackett PLLC

(57) ABSTRACT

A precision navigation device for a UAM route, and an operation method of the precision navigation device are disclosed. According to an embodiment of the present invention, a precision navigation device for a UAM route may comprise: a set of UAM navigation devices which include a left UAM navigation device and a right UAM navigation device with reference to a prescribed route of UAM, and generate, in the sky, a straight flight path including an altitude by using a radio signal; and a UAM mounting device which identifies, as the current location of the UAM, an intersection point on an instrument panel where a signal component of a left radio signal transmitted from the left UAM navigation device and a signal component of a right radio signal transmitted from the right UAM navigation device meet each other.

9 Claims, 13 Drawing Sheets

(58) Field of Classification Search
CPC ... G08G 5/53; G08G 5/55; G08G 5/90; B64D 45/00
See application file for complete search history.

(56) References Cited

U.S. PATENT DOCUMENTS

| | | | | |
|---|---|---|---|---|
| 2008/0297397 | A1* | 12/2008 | Oberg | G01S 19/15 342/357.53 |
| 2012/0265376 | A1* | 10/2012 | Fleiger-Holmes | G01S 19/20 701/16 |
| 2013/0211632 | A1* | 8/2013 | Caule | B64D 45/00 701/3 |
| 2015/0307207 | A1* | 10/2015 | Meunier | B62D 43/02 701/16 |
| 2016/0012735 | A1* | 1/2016 | Koukol | B64D 45/04 701/17 |
| 2017/0124886 | A1* | 5/2017 | Ishihara | G01S 1/02 |
| 2017/0356757 | A1* | 12/2017 | Bourret | G01C 21/005 |
| 2019/0113593 | A1* | 4/2019 | Bazile | G01S 1/18 |
| 2020/0249701 | A1* | 8/2020 | Murata | G01F 23/802 |
| 2020/0273356 | A1* | 8/2020 | Raynaud | G01C 23/005 |
| 2020/0369384 | A1* | 11/2020 | Kelly | B64U 10/13 |
| 2022/0319339 | A1* | 10/2022 | Nanukuttan | B64C 39/024 |
| 2024/0118710 | A1* | 4/2024 | Stein | G08G 5/25 |

FOREIGN PATENT DOCUMENTS

| | | | |
|---|---|---|---|
| JP | 2009-075754 | A | 4/2009 |
| KR | 10-1398382 | B1 | 5/2014 |
| KR | 10-2019-0138294 | A | 12/2019 |
| KR | 10-2022-0010893 | A | 1/2022 |
| WO | WO2022019432 | A1 * | 1/2022 |

OTHER PUBLICATIONS

Machine translation for JPH10160812A, Jun. 19, 1998, Nishimura Takashi.*

International Search Report issued in PCT/KR2022/005683; mailed Dec. 28, 2022.

An Office Action mailed by the Korean Intellectual Property Office on Sep. 20, 2024, which corresponds to Korean Patent Application No. 10-2022-0042943 and is related to U.S. Appl. No. 18/712,031.

* cited by examiner (i) IN CASE OF 10 KHZ PER CHANNEL (ii) IN CASE OF 10 KHZ PER CHANNEL (iii) BANDWIDTH ACCORDING TO NUMBER OF NAVIGATION DEVICE SETS

PRECISION NAVIGATION DEVICE FOR UAM ROUTE, AND OPERATION METHOD OF PRECISION NAVIGATION DEVICE

CROSS-REFERENCE TO RELATED APPLICATIONS

This application is the U.S. National Stage of International Application No. PCT/KR2022/005683 filed Apr. 21, 2022, which claims benefit of priority to Korean Patent Application No. 10-2022-0042943 filed Apr. 6, 2022, the entire content of which is incorporated herein by reference.

TECHNICAL FIELD

The present disclosure relates to a precision navigation device for a UAM route, and an operation method of the precision navigation device, for ensuring safety and precision of flight in the field of urban air mobility (UAM), which has recently been researched and developed with the goal of operating in urban areas and at low altitudes.

In particular, the present disclosure provides a technology that develops a UAM dedicated navigation system by applying a basic concept of an instrument landing system (ILS) which is a navigation device which is installed in an existing airport and proven to be reliable and precise.

BACKGROUND ART

UAM is an urban air mobility that can utilize the sky as a travel corridor by combining with a personal air vehicle (PAV) capable of vertical takeoff and landing (VTOL). The UAM can be a next-generation mobility solution that maximizes mobility efficiency in urban areas.

The UAM emerges to solve the decline in travel efficiency caused by urban congested traffic and the rapid increase in social costs such as logistics transportation costs. Now that long-distance travel times have increased and traffic congestion has become more severe, the UAM is considered a future innovative business that solves these problems.

Navigation devices currently used in the UAM are representative of GPS-based ground-Based augmentation system (GBAS) and high-precision satellite based augmentation system (SBAS), and as related technologies, positioning technology using communication networks and location information extraction technology using terrain images are being researched.

UAM navigation devices that mainly use GPS-based technology have problems with vulnerability to safety (frequency disturbance, etc.).

In addition, it is known that the application of the positioning technology using the communication network and an image processing technique using the terrain images to the UAM lacks precision.

GPS technology is used as a main navigation device in the existing aviation field, but in order to ensure high precision and safety, various types of navigation devices must be used simultaneously.

The UAM aims to operate in urban areas and at low altitudes, so the UAM requires more stringent precision and safety than the existing aviation field.

Therefore, there is an urgent need for design concepts and implementation technologies for a precision navigation device for a UAM route, and an operation method of the precision navigation device.

DETAILED DESCRIPTION OF INVENTION

Technical Problems

An embodiment of the present disclosure provides a precision navigation device for a UAM route, and an operation method of the precision navigation device, which include an implementation technology for the precision navigation device for a UAM route aimed at high precision and safety.

Further, an embodiment of the present disclosure provides a precision navigation device for a UAM route, which is installed on the ground and transmits a specific signal to provide an accurate flight path and distance information to the UAM.

In addition, an embodiment of the present disclosure provides development of a UAM dedicated navigation system by applying a basic concept of an instrument landing system (ILS) which is a navigation device which is installed in an existing airport and proven to be reliable and precise.

Technical Solution

According to an embodiment of the present disclosure, a precision navigation device for a UAM route may include: a UAM navigation device constituted by one set of left and right navigation devices based on a defined route of a UAM, and generating a straight flight path including an altitude in the sky by using radio signals; and a UAM mounting device identifying an interaction point on an instrument panel, where a signal component of a left radio signal transmitted by the left UAM navigation device at the left side and a signal component of the right radio signal transmitted by the right UAM navigation device at the right side meet as a current location of the UAM.

Furthermore, according to an embodiment of the present disclosure, an operation method of a precision navigation device for a UAM route may include: generating, by a UAM navigation device constituted by one set of left and right navigation devices based on a defined route of a UAM, a straight flight path including an altitude in the sky by using radio signals; and identifying, by a UAM mounting device, an interaction point on an instrument panel, where a signal component of a left radio signal transmitted by the left UAM navigation device at the left side and a signal component of the right radio signal transmitted by the right UAM navigation device at the right side meet as a current location of the UAM.

Effect of Invention

According to an embodiment of the present disclosure, a precision navigation device for a UAM route, and an operation method of the precision navigation device can be provided, which include an implementation technology for the precision navigation device for a UAM route aimed at high precision and safety.

Further, according to the present disclosure, a precision navigation device for a UAM route is installed on the ground and transmits a specific signal to provide an accurate flight path and distance information to UAM.

In addition, according to the present disclosure, a UAM dedicated navigation system can be developed by applying a basic concept of an instrument landing system (ILS) which is a navigation device which is installed in an existing airport and proven to be reliable and precise.

BEST MODE FOR CARRYING OUT THE INVENTION

Figure 1:
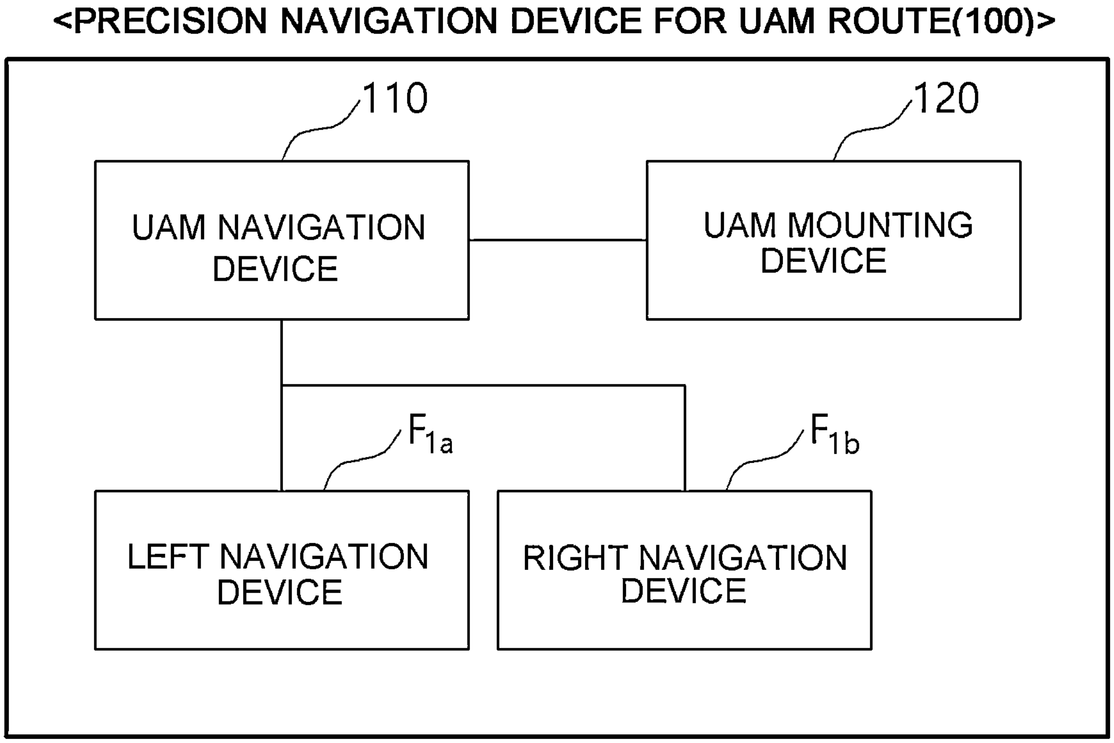
FIG. 1 is a block diagram illustrating a configuration of a precision navigation device for a UAM route according to an embodiment of the present disclosure.

Hereinafter, embodiments will be described in detail with reference to the accompanying drawings. However, various changes may be made to the embodiments, and thus the scope of the patent application is not limited or limited by these embodiments. It should be understood that all changes, equivalents, or substitutes to the embodiments are included in the scope of the rights.

The terms used in the examples are used for illustrative purposes only and should not be interpreted as limiting. A singular form includes a plural form if there is no clearly opposite meaning in the context. In the present application, it should be understood that the term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If not contrarily defined, all terms used herein including technological or scientific terms have the same meanings as those generally understood by those skilled in the art. Terms which are defined in a generally used dictionary should be interpreted to have the same meaning as the meaning in the context of the related art, and are not interpreted as an ideal meaning or excessively formal meanings unless clearly defined in the present application.

In addition, in the description with reference to the accompanying drawings, the same components are assigned the same reference numerals regardless of the reference numerals, and redundant descriptions thereof will be omitted. In describing the embodiment, a detailed description of related known technologies will be omitted if it is determined that they make the gist of the embodiment unclear.

FIG. 1 is a block diagram illustrating a configuration of a precision navigation device for a UAM route according to an embodiment of the present disclosure.

Referring to FIG. 1, a precision navigation device 100 for a UAM route according to an embodiment of the present disclosure may be configured to include a UAM navigation device 110 installed on the ground and a UAM mounting device 120 mounted on an UAM aircraft. The UAM navigation device 110 may include a left navigation device F1*a* and a right navigation device F1*b*.

First, the UAM navigation device 110 may be constituted by one set of left and right navigation devices based on a defined route of UAM. In other words, the UAM navigation device 110 may be constituted by one set of a left navigation device F1*a* and a right navigation device F1*b* that are placed to be spaced on both left and right sides based on the center of a predetermined skyway.

The UAM navigation device 100 may generate a straight flight path including an altitude in the sky using a radio signal.

The left and right navigation devices of the UAM navigation device 110 may independently transmit a carrier frequency, a first AM modulation signal, and a second AM modulation signal.

Each of the left and right navigation devices calculates a difference in depth of modulation (DDM) between the first AM modulation signal and the second AM modulation signal to generate a flight path including the altitude at which the UAM flies.

In other words, the UAM navigation device 110 may serve to generate a flight path as a UAM flight path by utilizing a technology of an instrument landing system (ILS), which is proven to be precise and safe.

The UAM navigation device 110 may radiate RF signals which are radio signals, into the air, including AM modulation signals, through a plurality of antennas, respectively, and may compare magnitudes (absolute values) of the respective radiated AM modulation signals, and calculate a difference value as the DDM.

The UAM navigation device 110 may be constituted by the left navigation device F1*a* and the right navigation device F1*b* as one set. That is, the UAM navigation device 110 may be constituted by one set of navigation devices that transmit the radio signals on left and right sides separated by a predetermined distance, respectively.

The set constituted by the left navigation device F1*a* and the right navigation device F1*b*, is connected in succession to generate a long-distance flight path on which the UAM flies.

In generating the flight path, the UAM navigation device 110 may determine an intersection point of a '0' DDM area calculated by the left navigation device F1*a* and a '0' DDM area calculated by the right navigation device F1*b* as a navigation signal center line, and generate a single flight path by using the navigation signal center line as the flight path.

For example, in FIG. 2C, which will be described later, it is illustrated that the intersection point between the '0 DDM area' calculated by the left navigation device F1*a* and the '0 DDM area' calculated by the right navigation device F1*b* is set as the navigation signal center line, and generated as the single flight path.

In transmitting the radio signals, the UAM navigation device 110 may transmit the radio signal within 90 degrees for a vertical pattern (a direction perpendicular to the ground) and in the range of 0 to 180 degrees or −90 to +90 degrees for a horizontal pattern (a direction parallel to the ground) at locations where the left and right navigation devices are installed.

Through this, the UAM navigation device 110 may generate an area in which the DDM calculated by the carrier, the first AM modulation signal, and the second AM modulation signal transmitted by the left navigation device is '0', and an area in which the DDM calculated by the carrier, the first AM modulation signal, and the second AM modulation signal transmitted by the right navigation device is '0', and set the intersection point of the '0' DDM areas generated by the left and right navigation devices, respectively as the single flight path.

Further, the precision navigation device 100 for a UAM route variously calculates the DDM as a non-zero value to generate multiple flight paths.

The left navigation device F1*a* may determine a '+DDM (left) area' and a '−DDM (left) area' spaced vertically from the navigation signal center line by a predetermined value.

For example, the left navigation device F1*a* may determine a '+0.150 DDM (left) area' spaced high vertically from the navigation signal center line which is the '0 DDM area' and a '−0.150 DDM (left) area' spaced low vertically from the navigation signal center line which is the '0 DDM area'.

The right navigation device F1*b* may determine a '+DDM (right) area' and a '−DDM (right) area' spaced vertically from the navigation signal center line by a predetermined value.

For example, the right navigation device F1*b* may determine a '+0.150 DDM (right) area' spaced high vertically and a '−0.150 DDM (right) area' spaced low vertically from the navigation signal center line which is the '0 DDM area'.

The UAM navigation device 110 may generate the multiple flight paths by setting each of the '+DDM (left) area', the '−DDM (left) area', the '+DDM (right) area', and the '−DDM (right) area' as the flight path.

For the above-mentioned examples, the UAM navigation device 110 may generate four calculated areas (the '+0.150 DDM (left) area', the '−0.150 DDM (left) area', the '+0.150 DDM (right) area', and the '−0.150 DDM (right) area' as multiple flight paths on which the UAM may fly.

In some embodiments, the precision navigation device 100 for a UAM route may identify the UAM on a virtual plane constituted by the multiple flight paths, and confirm a current location of the UAM through identified coordinates.

Through this, the UAM navigation device 110 may generate the '+DDM (left) area', the '−DDM (left) area', the '+DDM (right) area', and the '−DDM (right) area'. Thereafter, the UAM mounting device 120 mounted on a UAM aircraft confirms current coordinates of the UAM from navigation signals of the '+DDM (left) area', the '−DDM (left) area', the '+DDM (right) area', and the '−DDM (right) area' generated by the UAM navigation device 110 to confirm a degree at which the UAM deviates from the navigation signal center line.

In the above examples, on a virtual plane surrounded by four areas ('+0.150 DDM (left) area', '−0.150 DDM (left) area', '+0.150 DDM (right) area', and '−0.150 DDM (right) area'), the UAM mounting device 120 identifies UAM coordinates [(+0.100 DDM (left), −0.100 DDM (right)] to confirm the current location of the UAM, and confirm a degree ($=\sqrt{((0.01)^2+(0.01)^2)}$ at which the UAM deviates from the navigation signal center line numerically.

The precision navigation device 100 for a UAM route may determine the location of the UAM from the DDM of the radio signals transmitted by the left and right navigation devices.

In some embodiments, the UAM navigation device 110 may adjust or change a pre-generated flight path according to a surrounding environment.

To this end, the UAM navigation device 110 adjusts transmitted electric power to vary a navigation device operation area (1 to 10 km) and vary a frequency bandwidth (channel) through which the radio signal is transmitted, and as the number of sets increases with the increase in entire route, the frequency bandwidth (channel) may increase proportionally.

That is, the UAM navigation device 110 changes the transmitted electric power output from each antenna, and changes the '0' DDM areas generated by the left and right navigation devices to adjust the flight path in a specific direction.

In addition, in connecting the plurality of sets SET constituted by the left navigation device F1*a* and the right navigation device F1*b* in succession to generate the long-distance flight path, the UAM navigation device 110 may support the generation of the long-distance flight path adjusted in various directions by increasing the size of the frequency bandwidth (channel) in proportion to the number of connected sets.

The UAM mounting device 120 may provide flight information such as UAM location information, information of the UAM navigation device 110, UAM aircraft information, etc., to a UAM pilot and a ground operator in real time. The UAM mounting device 120 may extract current location information from the navigation signal of the UAM navigation device 110, and display the flight path on a cockpit instrument panel inside the UAM.

The UAM navigation device 110 transmits a unique ID indicated in the order of route, navigation device sequence, and azimuth information, thereby enabling the UAM mounting device 120 to receive route information on which the UAM is currently flying.

For example, the UAM navigation device 110 transmits a unique ID 'AA180' to the UAM to provide information that the UAM passes through an A-th navigation device on route A, and the UAM flies in an azimuth of 180 degrees.

Further, the UAM mounting device 120 may identify an interaction point on the instrument panel, where a signal component of a left radio signal transmitted by the left UAM navigation device at the left side and a signal component of the right radio signal transmitted by the right UAM navigation device at the right side meet as the current location of the UAM.

Further, the UAM mounting device 120 may confirm a degree at which the UAM is separated from the route according to a state in which the intersection point is separated up, down, left, and right at the center of the instrument panel.

The UAM mounting device 120 may include an instrument panel that is mounted on the UAM and displays the generated flight path. In other words, the UAM mounting device 120 may serve to display the generated flight path on the instrument panel included in the UAM.

On the instrument panel, a point where the radio signal received from the left navigation device and the radio signal received from the right navigation device overlap may be expressed as the current location of the UAM. In other words, the UAM mounting device 120 may output the current location of the UAM flying along the navigation signal center line, which is the point where the radio signals overlap, through the instrument panel.

According to an embodiment of the present disclosure, a precision navigation device for a UAM route, and an operation method of the precision navigation device can be provided, which include an implementation technology for the precision navigation device for a UAM route aimed at high precision and safety.

Further, according to the present disclosure, a precision navigation device for a UAM route is installed on the ground and transmits a specific signal to provide an accurate flight path and distance information to a UAM.

In addition, according to the present disclosure, a UAM dedicated navigation system can be developed by applying a basic concept of an instrument landing system (ILS) which is a navigation device which is installed in an existing airport and proven to be reliable and precise.

The present disclosure relates to a structure concept and implementation technology for the precision navigation device 100 for a UAM route.

Currently, it is known that the UAM navigation device mainly uses a GPS-based technology, but has a problem of vulnerabilities in safety (frequency disturbance, etc.), and a positioning technology using a communication network and an image processing technique using a terrain image are known to lack precision.

GPS technology is used as a main navigation device in the existing aviation field, but in order to ensure high precision and safety, various types of navigation devices need to be used simultaneously.

The UAM aims to operate in urban areas and at low altitudes, so the UAM requires more stringent precision and safety than the existing aviation field.

Therefore, there is an urgent need for a precision navigation device for a UAM route that aims for high precision and safety.

In the present disclosure, a precision navigation device 100 for a UAM route is implemented, aiming at high precision and safety.

In addition, in the present disclosure, a precision navigation device 100 for a UAM route that is installed on the ground and provides a precise flight path to the UAM by transmitting a specific signal is implemented.

The precision navigation device 100 for a UAM route of the present disclosure may be implemented by applying the concept of an instrument landing facility whose high precision and safety are proven in the aviation field.

A signal transmitted by the precision navigation device 100 for a UAM route is an AM modulation signal, and a route (flight path) may be configured by using a difference in depth on modulation (DDM) component.

In the precision navigation device 100 for a UAM route, one navigation device and two navigation devices may be constituted as 1 set at left and right sides based on the navigation signal center line.

The instrument panel displayed on the precision navigation device 100 for a UAM route may display one set of signal components of the left and right navigation devices, respectively, in a diagonal form or a coordinate-converted horizontal/vertical form.

The precision navigation device 100 for a UAM route may determine an intersection point where two diagonal lines meet as the current location of the UAM, and identify that the UAM is positioned on the navigation signal center line when the intersection point is center of the instrument panel.

On the contrary, as the intersection point is positioned up, down, left and right on the navigation signal center line, the precision navigation device 100 for a UAM route allows where the UAM is positioned on the route (flight path) to be intuitively known.

The precision navigation device 100 for a UAM route may generate a single and multiple flight paths.

In the case of the single flight path, the precision navigation device 100 for a UAM route may show a single straight space in which a 0 DDM signal is formed.

Further, the precision navigation device 100 for a UAM route variously may implement multiple flight paths by using a difference in DDM signal component between the left and right navigation devices.

In the case of a round-trip route, the precision navigation device 100 for a UAM route may separate and configure the multiple flight paths into a space where the right navigation signal is 0 DDM and the left navigation signal is +0.150 DDM and a space where the right navigation signal is 0 DDM and the left navigation signal is −0.150 DDM.

On the contrary, the precision navigation device 100 for a UAM route may also separate and configure the multiple flight paths into a space where the left navigation signal is 0 DDM and the right navigation signal is +0.150 DDM, and a space where the left navigation signal is 0 DDM and the right navigation signal is −0.150 DDM.

±0.150 DDM in space is an example, and the DDM that makes up the route may be freely changed depending on a navigation device antenna pattern design and a radio wave environment.

In the precision navigation device 100 for a UAM route, the UAM navigation device 100 may generate multiple flight paths.

In the precision navigation device 100 for a UAM route, the UAM mounting device 120 may calculate location information for the UAM.

A method for calculating real-time location information of the UAM includes the three following methods.

1) The precision navigation device 100 for a UAM route may calculate the location information of the UAM from received signal strength indicator (RSSI) measurement and DDM for respective navigation device transmission signals.

2) The precision navigation device 100 for a UAM route may calculate the location information of the UAM by using a navigation device transmission signal magnitude DB and a DDM signal DB of the entire route.

3) The precision navigation device 100 for a UAM route may calculate the location information of the UAM by combining a positioning technology using a base station of a communication network (5G, etc.) and methods 1) and 2) described above.

The precision navigation device 100 for a UAM route may generate a precise flight path within an urban area.

The precision navigation device 100 for a UAM route adjusts the transmitted electric power of the navigation device to vary an operation range of 1 to 10 km.

Further, the navigation signal DDM transmitted by each navigation device may be converted into a length (m) indicating how much the UAM deviates vertically from the navigation signal center line.

In converting into the length indicating the deviation degree, the precision navigation device 100 for a UAM route may calculate the length by using a navigation device antenna beam pattern, a linear section of the DDM, a valid range of the DDM, etc.

A frequency bandwidth (channel) of one navigation device is 10 kHz or more.

When a bandwidth is configured as 10 kHz per navigation device, bandwidths of 1 set (two navigation devices, 1 each on the left and right) may be 50 kHz, including a Guard bandwidth.

When a bandwidth is configured as 20 kHz per navigation device, the bandwidths of 1 set may be doubled to 100 kHz.

With the same principle, when a bandwidth is configured as 100 kHz per navigation device, the bandwidths of 1 set may be 10 times larger to 500 kHz.

The total frequency bandwidth for the entire route may be 10 kHz per navigation device and 150 kHz when the entire navigation device is configured by repeating 3 sets in succession.

Similarly, when the entire navigation device is configured by repeating 4 sets in succession, the total frequency bandwidth may be 200 kHz, and when the entire navigation device is configured by repeating 5 sets in succession, the total frequency bandwidth may be 250 kHz.

The total number of navigation device sets is variable from a minimum of 3 sets to N sets, and the precision navigation device 100 for a UAM route may be configured by repeating N sets.

Each navigation device may transmit a unique identification (ID).

The same set (left and right navigation devices) may transmit the same ID.

An ID signal format is transmitted as Morse code or a digital signal, and the Morse code may be composed of dots (100 ms) and dashes (300 ms).

The ID signal format may consist of 5 characters and may be written in the order of route, navigation device sequence, and azimuth information.

A first written letter represents the route, and 36 independent route names may be represented from 0 to 9 and A to Z. In areas separated by a predetermined distance, route names are reusable.

A second written letter represents the navigation device sequence, and up to 36 navigation device sets may be represented in the order of letters from 0 to 9 and A to Z.

Three remaining letters represent azimuth information generated by the navigation device.

Azimuth angles are 0 degrees north, 90 degrees east, 180 degrees south, and 270 degrees west.

Therefore, when the navigation device ID received by the UAM mounting device is AA180, the UAM is on route A and passing the A-th (e.g., 11-th) navigation device. It can be seen that the flying route has an azimuth of 180 degrees.

The precision navigation device 100 for a UAM route may track a flight path of the UAM mounting device.

The UAM mounting device receives the navigation device transmission signal to track the round-trip flight path (forward and reverse directions).

The precision navigation device 100 for a UAM route may track a past/present/future flight path from transmission signal magnitudes and DDMs, and navigation device ID information (navigation device installation order, azimuth) of all navigation devices.

Figure 2A:
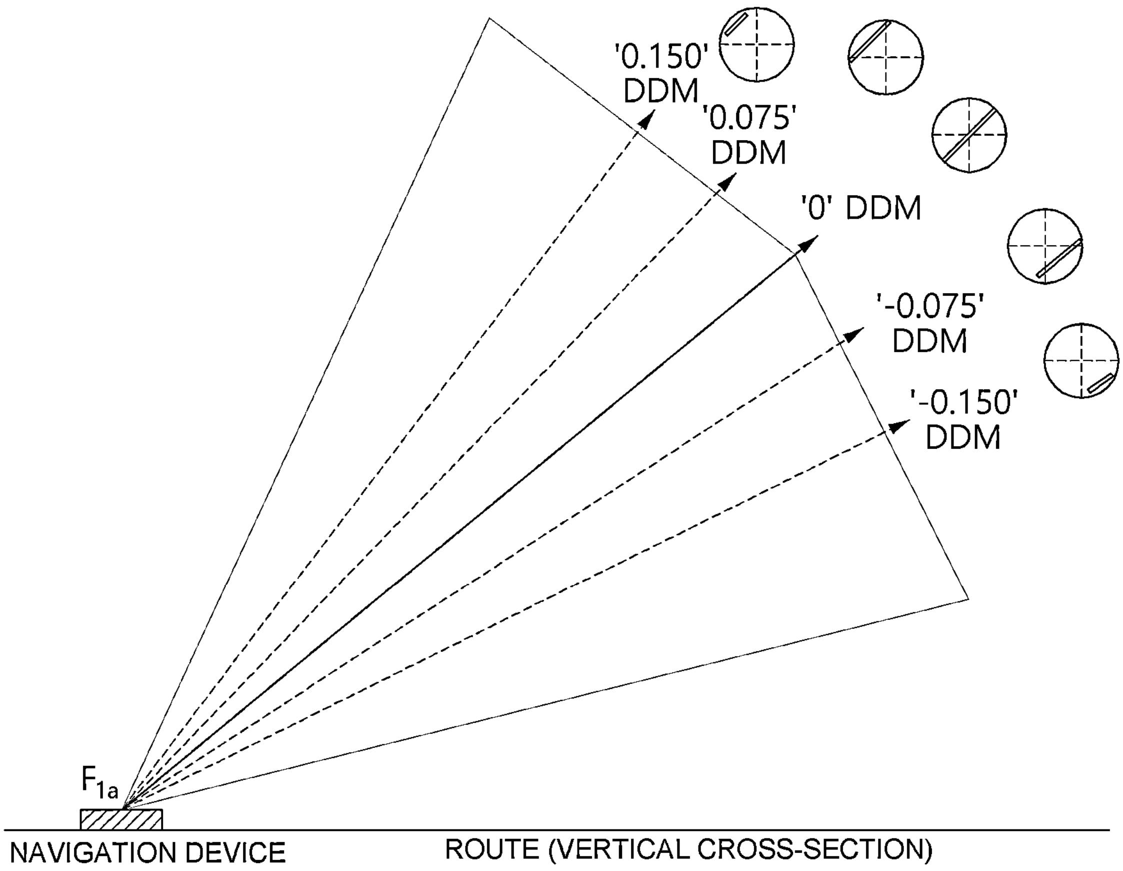
FIGS. 2A to 2C are exemplary diagrams for describing a left navigation device and a right navigation device.
Figure 2B:
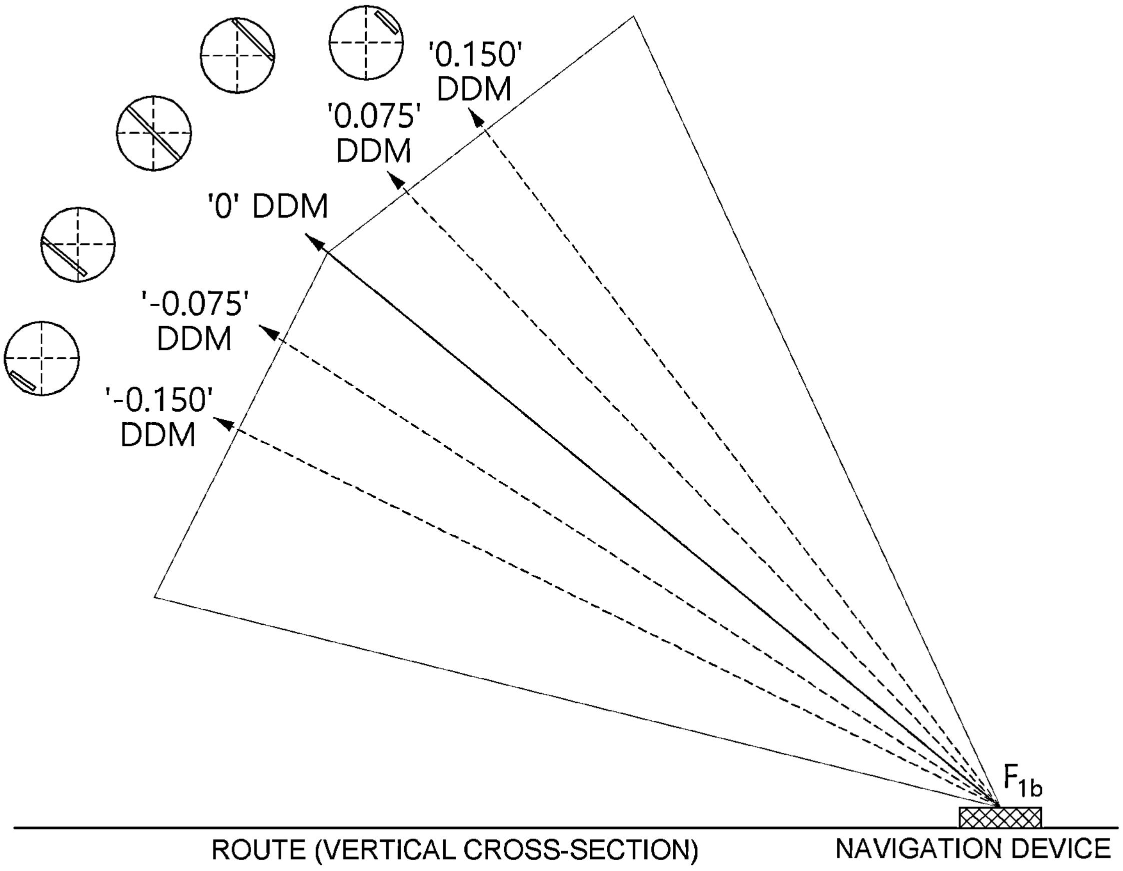
Figure 2C:
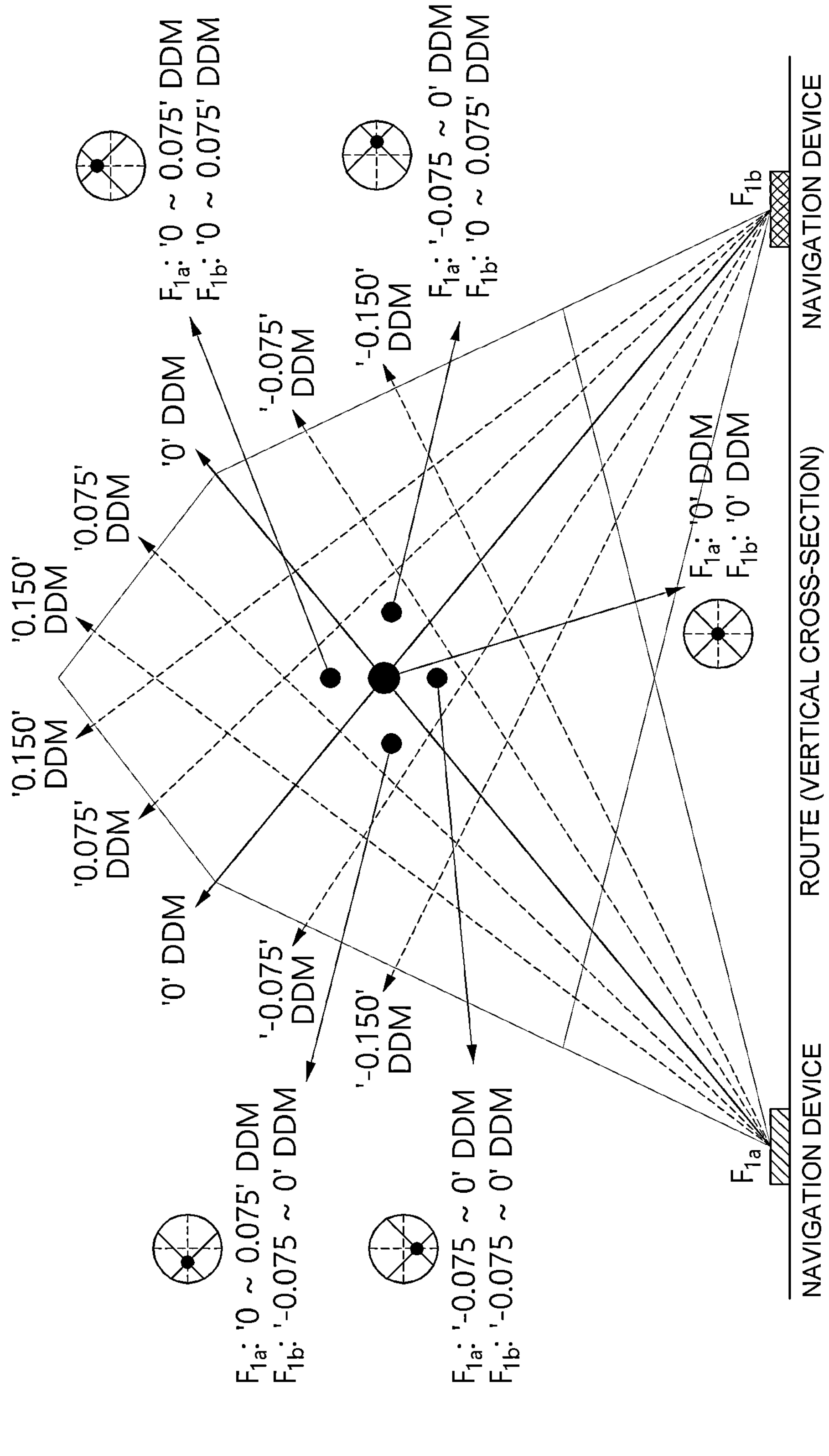

FIGS. 2A to 2C are exemplary diagrams for describing a left navigation device and a right navigation device.

FIG. 2A illustrates a signal transmitted from the left navigation device F1*a* among 1 set of navigation devices and a display shape on the instrument panel.

FIG. 2B illustrates a signal transmitted from the right navigation device F1*b* among 1 set of navigation devices and the display shape on the instrument panel.

As in FIGS. 2A and 2B, the precision navigation device 100 for a UAM route may be constituted by 1 set (1 each on the left and the right) of the left navigation device F1*a* and the right navigation device F1*b* having '0' DDM as the navigation signal center line.

FIG. 2A illustrates the left navigation device F1*a* and the vertical navigation signal center line.

An area where the Difference in Depth of Modulation (DDM) of the radio signal transmitted by the left navigation device F1*a* is '0' is a vertical navigation signal center line formed by the left navigation device F1*a*.

A display screen for each location may be displayed in a diagonal form or in a coordinate-converted horizontal/vertical form on an existing circular instrument panel familiar to aircraft pilots.

In a navigation signal component, based on the vertical navigation signal center line ('0' DDM), a vertical upward direction may be displayed as +DDM (e.g., 0.075 DDM, 0.150 DDM, etc.), and a vertical downward direction may be displayed as −DDM (e.g., −0.075 DDM, −0.150 DDM, etc.).

FIG. 2B illustrates the right navigation device F1*b* and the vertical navigation signal center line.

An area where the Difference in Depth of Modulation (DDM) of the radio signal transmitted by the right navigation device F1*b* is '0' is a vertical navigation signal center line formed by the right navigation device F1*b*.

The instrument panel according to each location may be displayed in the diagonal form or in the coordinate-converted horizontal/vertical form on the existing circular instrument panel familiar to the aircraft pilots.

In the navigation signal component, based on the vertical navigation signal center line ('0' DDM), a vertical right direction may be displayed as +DDM (e.g., 0.075 DDM, 0.150 DDM, etc.), and a vertical left direction may be displayed as −DDM (e.g., −0.075 DDM, −0.150 DDM, etc.).

FIG. 2C illustrates a signal transmitted by 1 set of navigation devices and the display shape in the instrument panel.

As illustrated in FIG. 2C, the precision navigation device 100 for a UAM route may be configured by 1 set in which the left navigation device F1*a* and the right navigation device F1*b* are combined.

An area where the Difference in Depth of Modulation (DDM) of the radio signal transmitted by each of the left navigation device F1*a* and the right navigation device F1*b* is '0' is a navigation signal center line perpendicular to the vertical navigation signal center line.

A case where both the left and right navigation signals are '0' DDM means that the UAM is on the vertical navigation signal center line.

A case where both the left and right navigation signals are +DDM means that the UAM is in the vertical upward direction on the vertical navigation signal center line and the vertical right direction on the vertical navigation signal center line.

A case where both the left and right navigation signals are −DDM means that the UAM is in the vertical downward direction on the vertical navigation signal center line and the vertical left direction on the vertical navigation signal center line.

Further, a case where both the left navigation signal is −DDM and the right navigation signal is +DDM means that the UAM is in the vertical downward direction on the vertical navigation signal center line and the vertical right direction on the vertical navigation signal center line.

A contrary case (the left navigation signal is +DDM and the right navigation signal is −DDM) means that the UAM is in the vertical upward direction on the vertical navigation signal center line and at a left side which is the vertical left direction on the vertical navigation signal center line.

The instrument panel according to each location may be displayed in the diagonal form or in the coordinate-converted horizontal/vertical form on the existing circular instrument panel familiar to the aircraft pilots.

A location where two diagonal lines overlap may be a current location of the UAM, and it may be intuitively known where the UAM is positioned on the route (center, and up, down, left, and right).

When the navigation device is operated on a single flight path, the UAM flies along the area in which the DDM of the signal transmitted by each navigation device is '0'.

Figure 3:
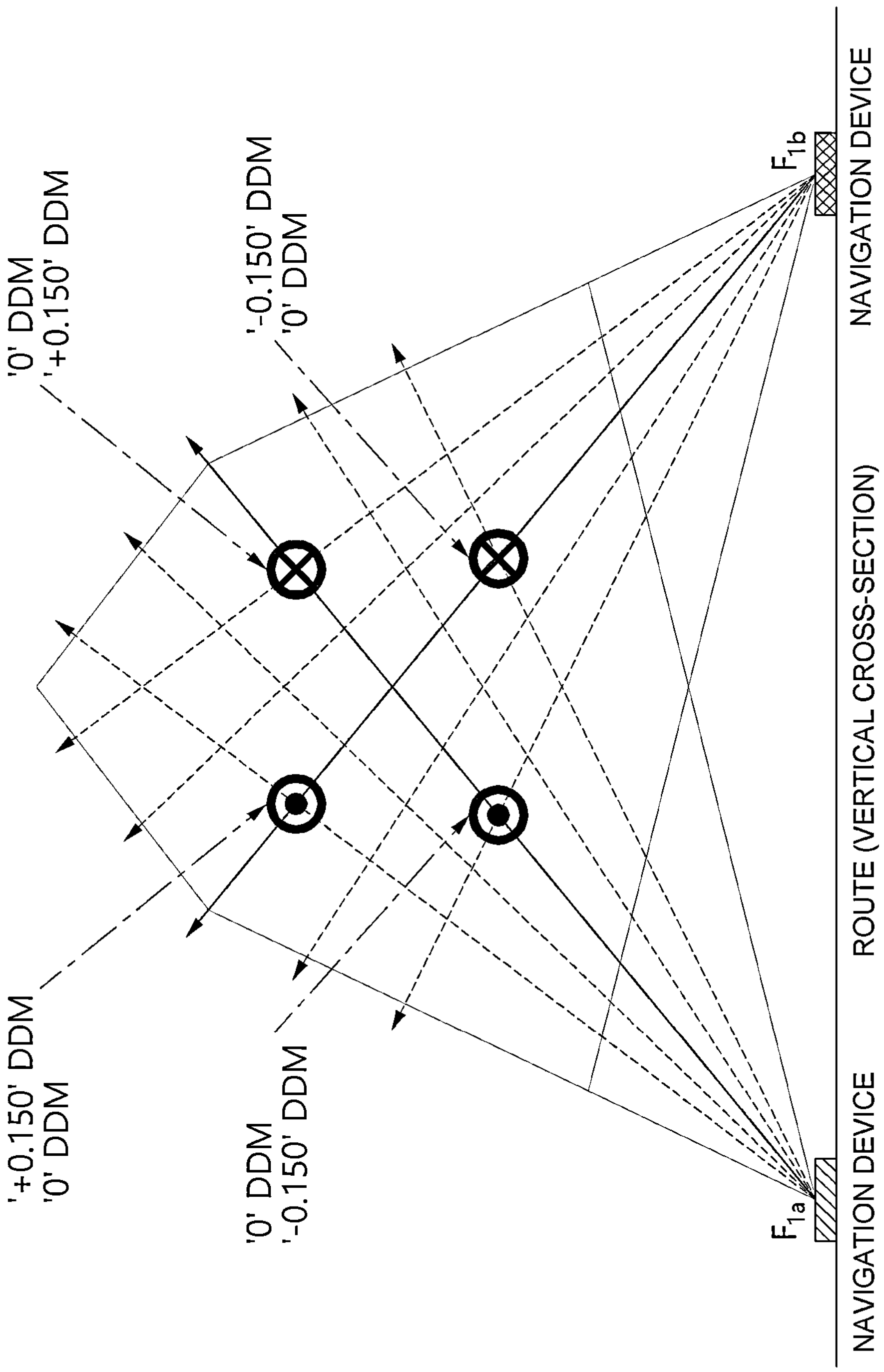
FIG. 3 is an exemplary diagram illustrating generation of multiple flight paths as a UAM dedicated flight path.

FIG. 3 is an exemplary diagram illustrating generation of multiple flight paths as a UAM dedicated flight path.

In FIG. 3, it is illustrated that multiple flight paths of the UAM are generated by the navigation device.

The multiple flight paths are particularly required for a configuration of various routes on which the UAM flies and a smooth flow when a UAM traffic amount increases.

For the generation of the multiple flight paths, the precision navigation device 100 for a UAM route may separate the multiple flight paths into the space where the right navigation signal is '0' DDM and the left navigation signal is +0.150 DDM and the space where the right navigation signal is 0 DDM and the left navigation signal is −0.150 DDM, and configure the multiple flight paths, as illustrated in FIG. 3.

On the contrary, the precision navigation device 100 for a UAM route may also separate and configure the multiple flight paths into a space where the left navigation signal is '0' DDM and the right navigation signal is +0.150 DDM, and a space where the left navigation signal is 0 DDM and the right navigation signal is −0.150 DDM, and configure the multiple flight paths.

±0.150 DDM in space is an example, and the DDM that makes up the route may be changed depending on the navigation device antenna pattern design and the radio wave environment.

The precision navigation device 100 for a UAM route may generate complex multiple flight paths.

Figure 4:
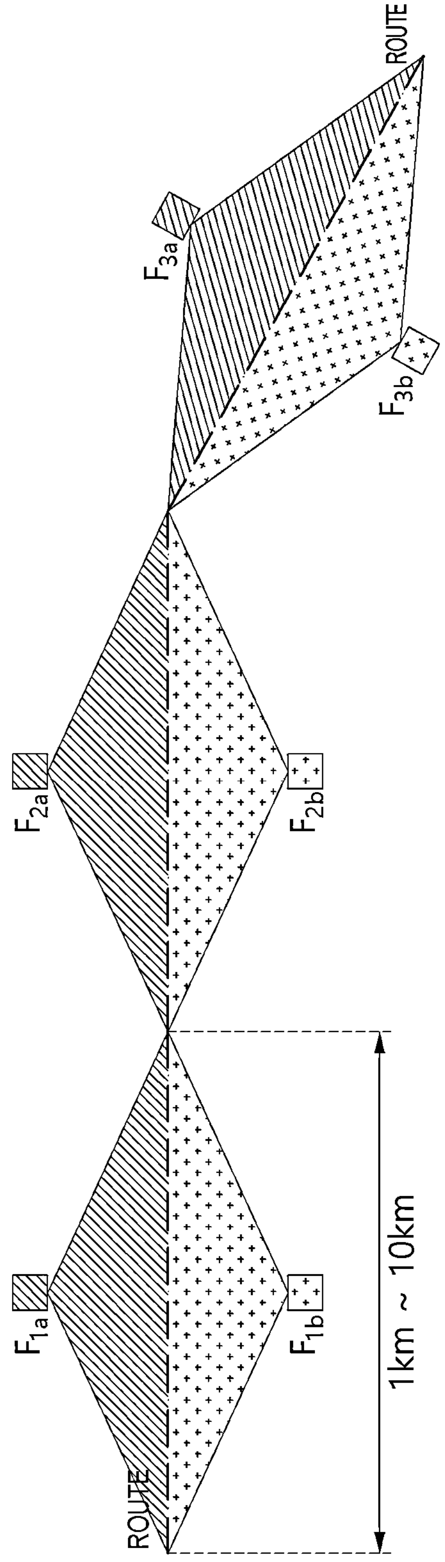
FIG. 4 is a basic configuration diagram of the precision navigation device for a UAM route.

FIG. 4 is a basic configuration diagram of the precision navigation device for a UAM route.

In FIG. 4, a basic configuration of the precision navigation device 100 for a UAM route is illustrated, which is configured by connecting 3 sets constituted by left navigation devices F1*a*, F2*a*, and F3*a* and right navigation devices F1*b*, F2*b*, and F3*b* in succession.

When the route is configured as in dotted lined in FIG. 4, a basic operation range of each navigation device set is 1 to 10 km, and it is also possible to expand the operation range as necessary.

Further, the DDM of the navigation signal transmitted by each navigation device may be converted into a length (m) indicating how much the UAM deviates vertically from the navigation signal center line.

The precision navigation device 100 for a UAM route may more accurately calculate the DDM by using a navigation device antenna beam pattern, a linear section of the DDM, a valid range of the DDM, etc.

Figure 5:
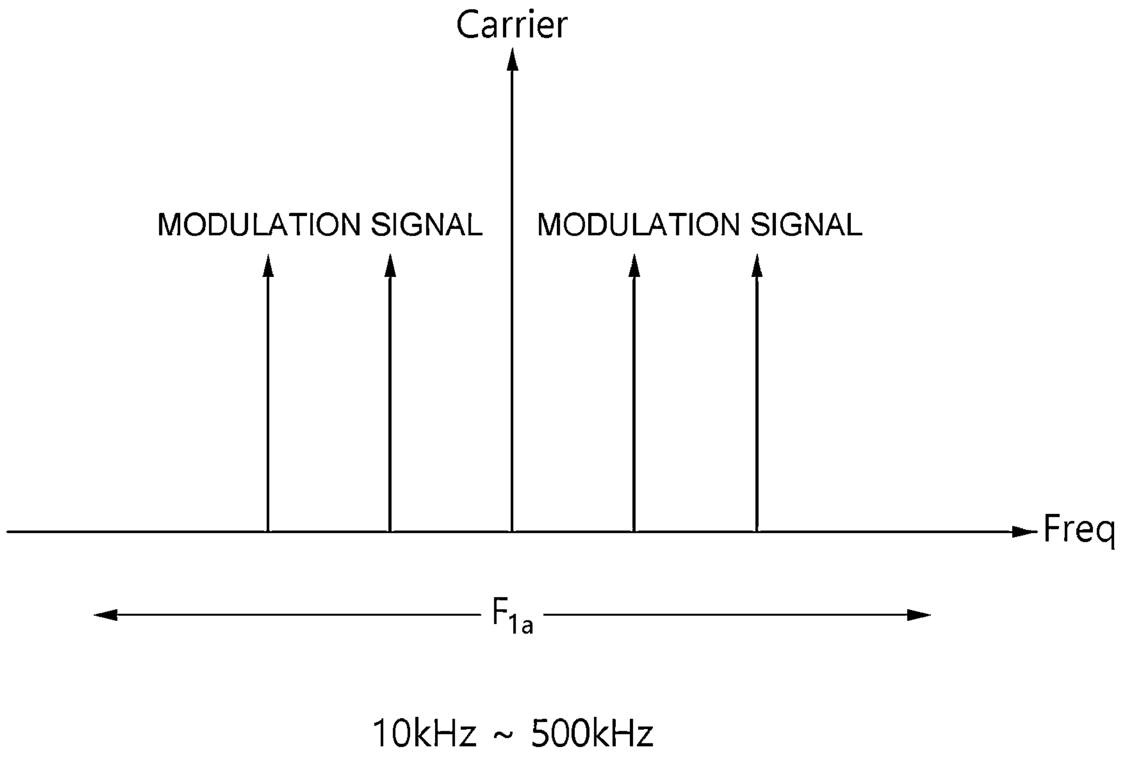
FIG. 5 is a diagram for describing a shape of a modulation signal.

FIG. 5 is a diagram for describing a shape of a modulation signal.

FIG. 5 illustrates the frequency bandwidth of the signal transmitted by the navigation device.

As in FIG. 5, a frequency bandwidth (channel) of one navigation device may be 10 kHz to 500 kHz, and may be flexibly determined by considering an operable frequency band and global standardization.

The precision navigation device 100 for a UAM route may determine, in consultation with relevant organizations, whether a drone control frequency band (5030 to 5091 MHZ) and a drone mission frequency band (5091 to 5150 MHz) are utilizable as a navigation device operation frequency.

Figure 6:
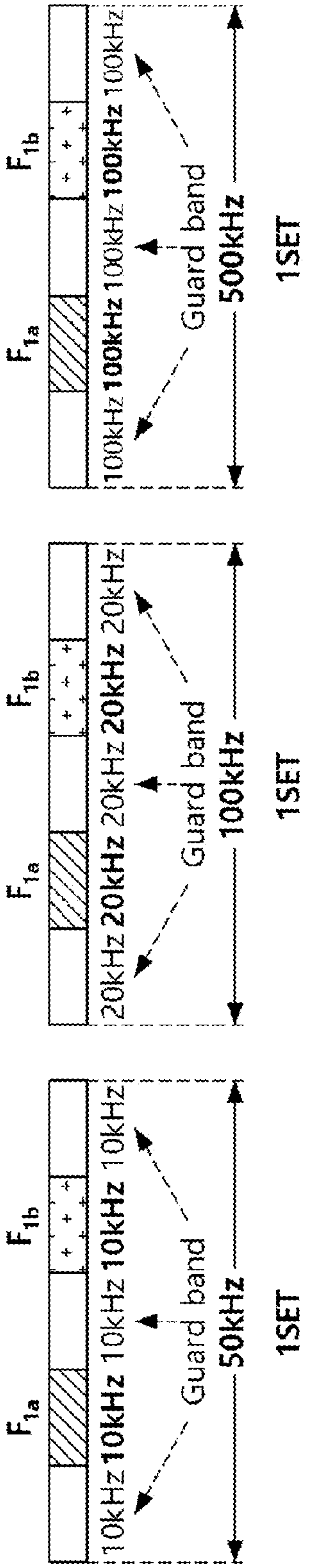
FIG. 6 is a diagram for describing allocation of a frequency channel to 1 set of navigation devices.

FIG. 6 is a diagram for describing allocation of a frequency channel to 1 set of navigation devices.

FIG. 6 illustrates frequency channel allocation per navigation device per 1 set of navigation devices.

As illustrated in FIG. 6, when one navigation device is configured with a bandwidth of 10 kHz, an allocated frequency bandwidth becomes 50 kHz, including the Guard bandwidth based on 1 set (two navigation devices, one each on the left and the right).

When one navigation device is configured with a bandwidth of 20 kHz, the bandwidth of 1 set becomes 100 kHz.

With the same principle, when one navigation device has a bandwidth of 100 kHz, the bandwidth of 1 set is 500 kHz.

Figure 7A:
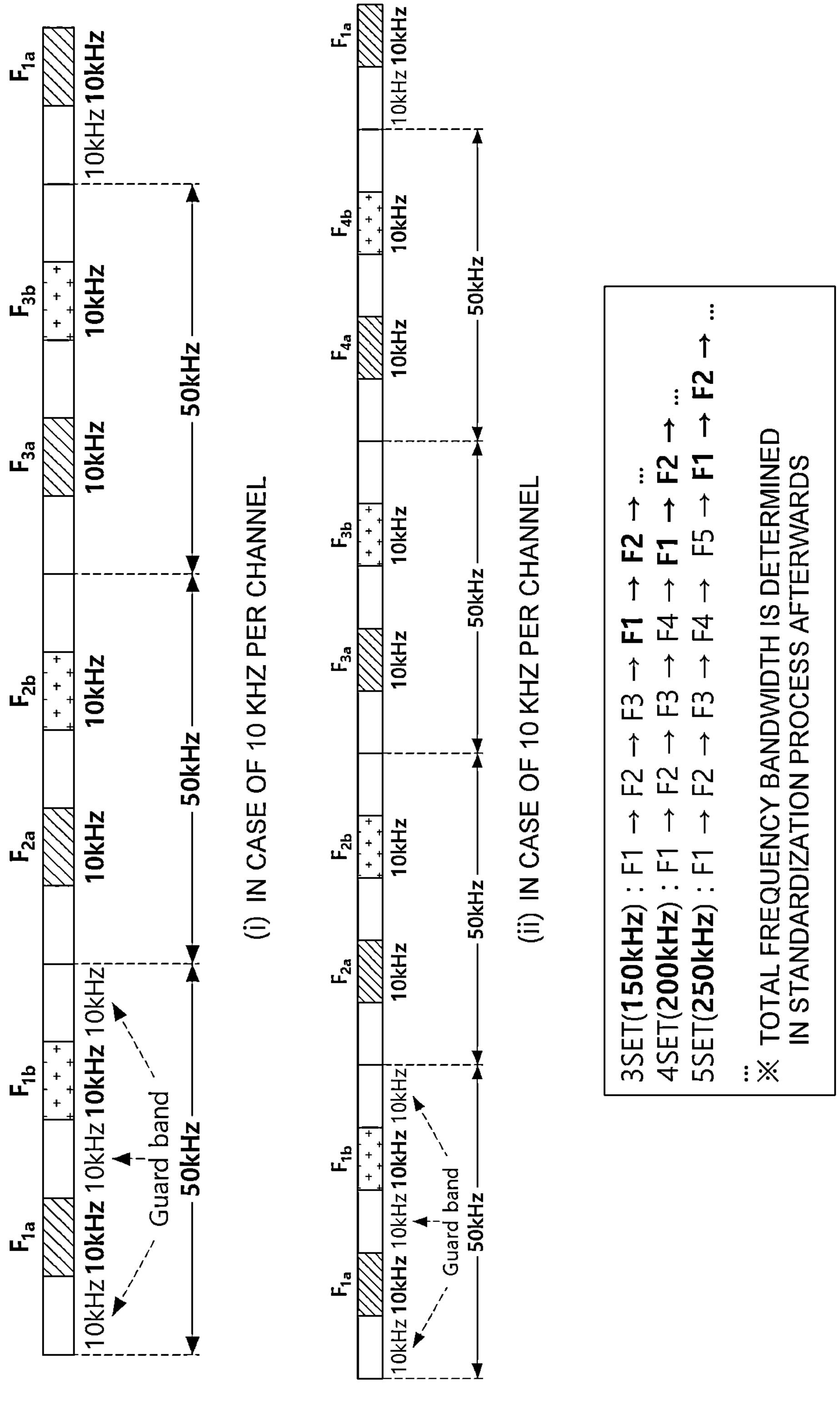
FIG. 7A is a diagram for describing a total frequency bandwidth for an entire route.

FIG. 7A is a diagram for describing a total frequency bandwidth for an entire route.

FIG. 7A illustrates the total frequency bandwidth for the entire route.

As in (i) of FIG. 7A, when the channel bandwidth of one navigation device is 10 kHz and all navigation devices are repeatedly configured in 3 sets in succession, the total bandwidth becomes 150 kHz.

As in (ii) of FIG. 7A, when the channel bandwidth of one navigation device is 10 kHz and all navigation devices are repeatedly configured in 4 sets in succession, the total bandwidth becomes 200 kHz.

Similarly, when the channel bandwidth of one navigation device is 10 kHz and all navigation devices are repeatedly configured in 5 sets in succession, the total bandwidth becomes 250 kHz.

In (iii) of FIG. 7A, a bandwidth according to the number of sets of navigation devices is illustrated.

The number of all navigation device sets is variable from a minimum of 3 sets to N sets, and N sets are repeatedly configured.

For example, when the total bandwidth is 250 kHz repeatedly in 5 sets in succession, an order of all navigation device sets may become "F1-F2-F3-F4-F5-F1-F2 . . . ".

Figure 7B:
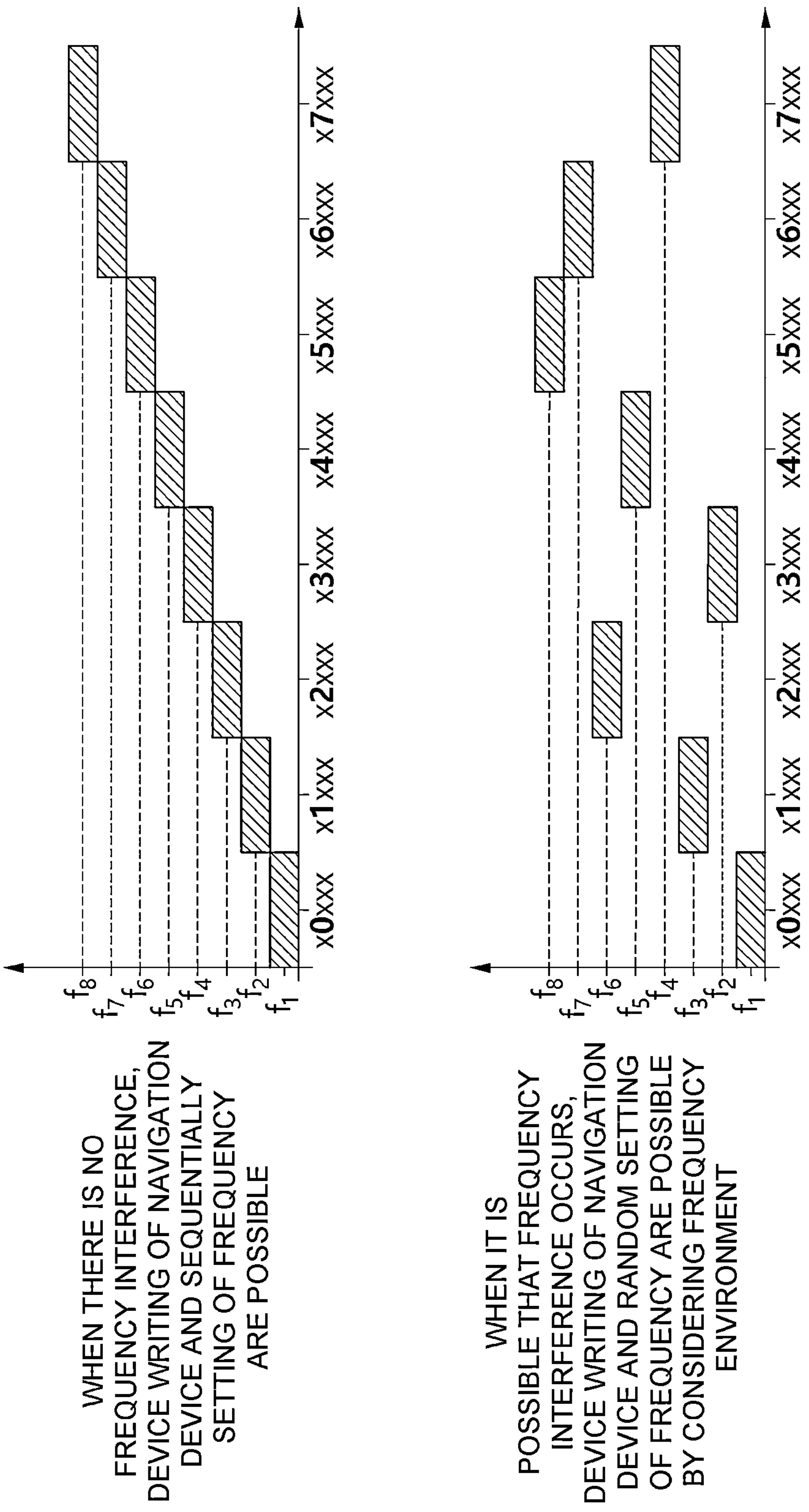
FIG. 7B is a frequency channel layout diagram according to frequency interference.

FIG. 7B is a frequency channel layout diagram according to frequency interference.

In FIG. 7B, a linear configuration or a random configuration of the frequency channel is possible by considering a route configuration and a radio wave environment of an area in which the navigation device is installed.

Figure 8A:
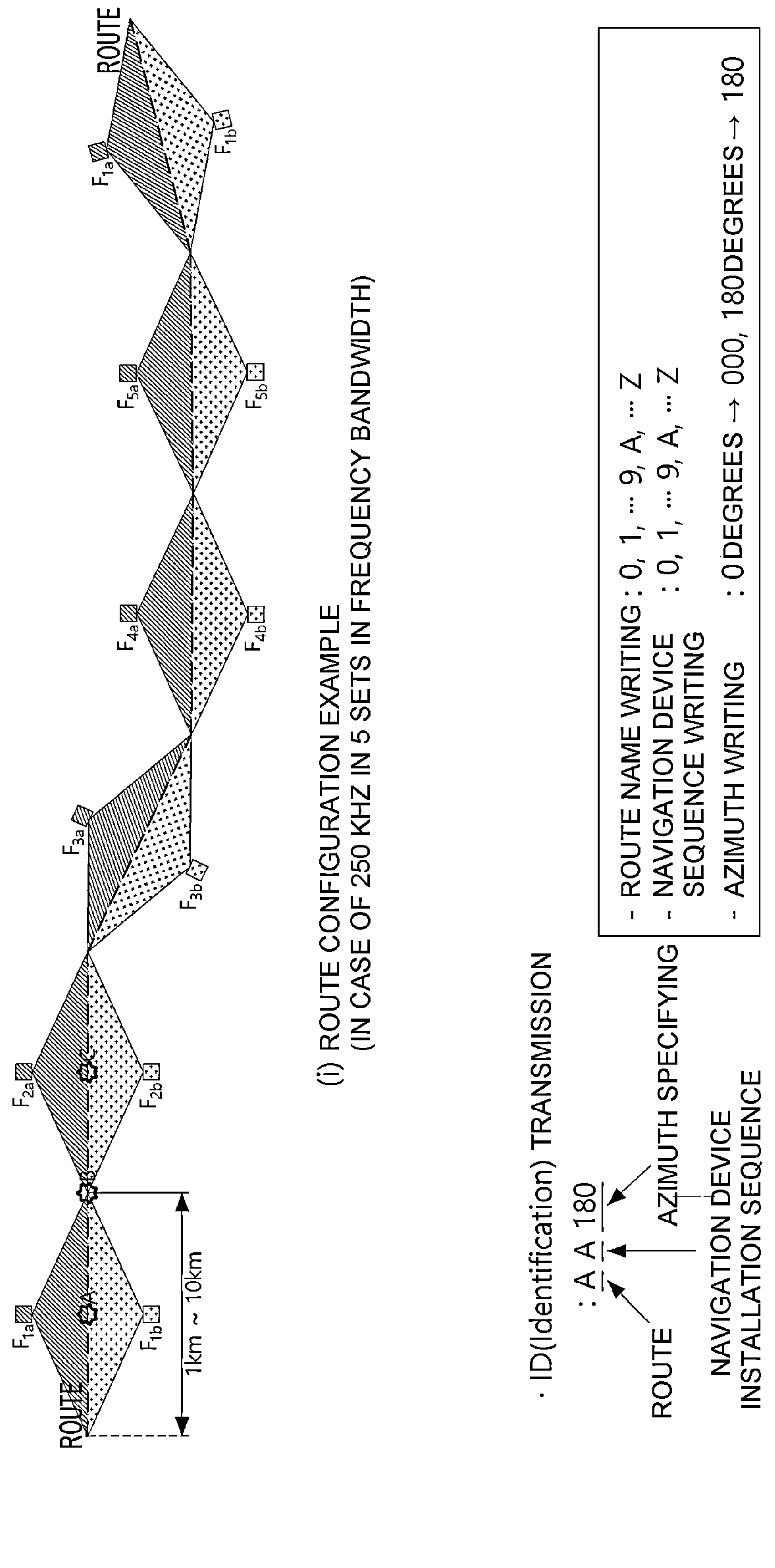
FIG. 8A is a diagram for describing a UAM route configuration.

FIG. 8A is a diagram for describing a UAM route configuration.

In (i) of FIG. 8A, the UAM route is illustrated.

In (i) of FIG. 8A, 5 sets of navigation devices are repeatedly configured in succession.

The precision navigation device 100 for a UAM route adjusts the transmitted electric power of 1 set of navigation devices to vary an operation range of 1 to 10 km.

Each navigation device transmits a unique identification (ID).

The same set (left and right navigation devices) transmits the same ID.

An ID signal format is transmitted as Morse code or a digital signal, and the Morse code may be composed of dots (100 ms) and dashes (300 ms).

As in (ii) of FIG. 8A, the ID signal format is constituted by 5 letters, and written in the order of the route, the navigation device order, and the azimuth information.

A route name which is a first letter is written with 0 to 9 and A to Z, and 36 independent route names may be expressed. In areas separated by a predetermined distance, route names are reusable.

A second letter represents a navigation device sequence, and up to 36 navigation device sets may be represented in the order of letters from 0 to 9 and A to Z.

Three remaining letters represent azimuth information generated by the navigation device.

Azimuth angles are 0 degrees north, 90 degrees east, 180 degrees south, and 270 degrees west.

Therefore, in a case where the navigation device ID received by the UAM mounting device is AA180, the case may mean that the UAM is on route A and passing the A-th (e.g., 11-th) navigation device.

It can be seen that the flying route has an azimuth of 180 degrees.

Figure 8B:
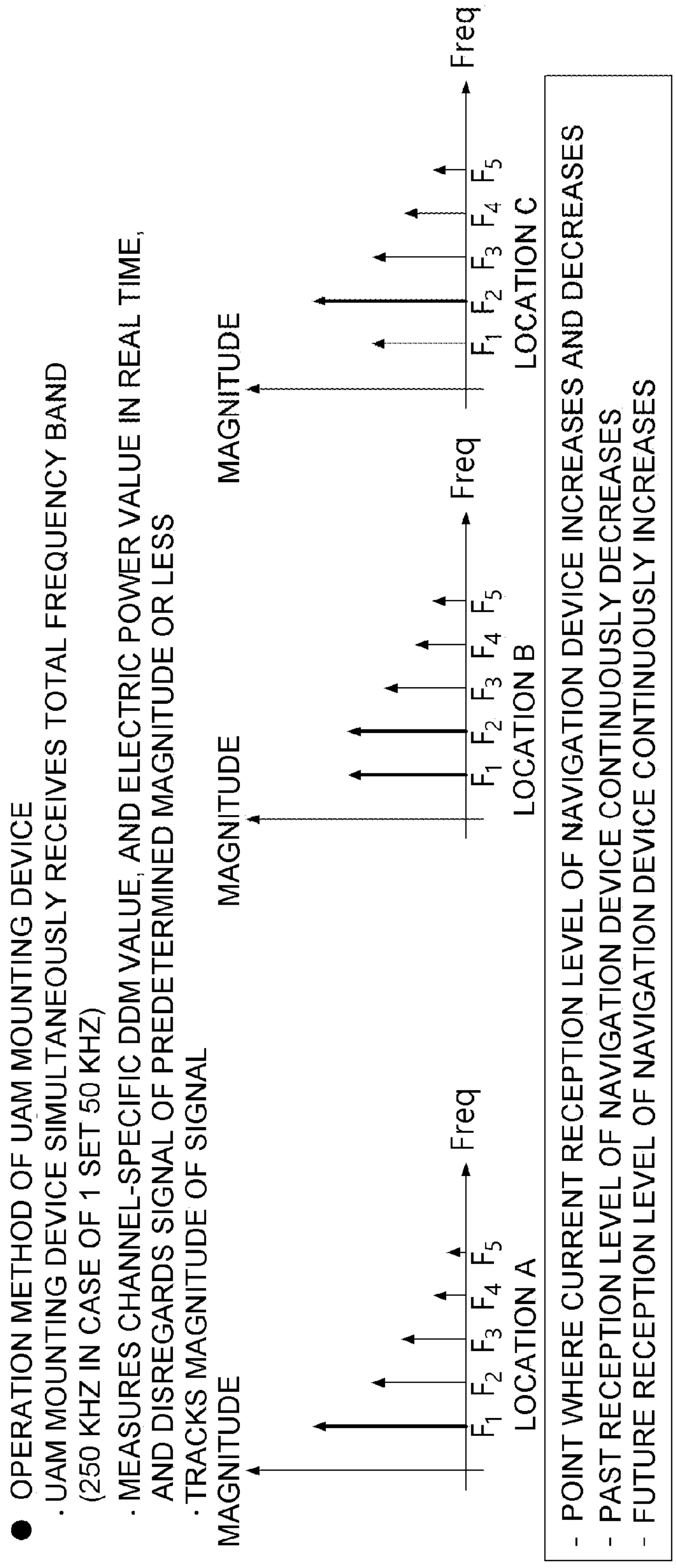
FIG. 8B is a diagram for describing an operation method of a UAM mounting device.

FIG. 8B is a diagram for describing an operation method of a UAM mounting device.

The UAM mounting device 120 may process a signal by simultaneously receiving all frequency channels F1*a* to F5*b* of the route of FIG. 8A.

The UAM mounting device 120 may measure a DDM value for each frequency channel, a received electric power value, an ID, a signal quality, etc. of the UAM navigation device 110 in real time, and disregard a signal of a predetermined magnitude or less and track a magnitude of a channel-specific signal.

As in FIG. 8B, at location A, a first navigation device transmission signal is largest, and the remaining navigation device transmission signal may be small as a distance increases.

When the UAM moves from location A to location B, the first navigation device transmission signal becomes gradually smaller, and a second navigation device transmission signal becomes gradually larger, and at location B, magnitudes of both signals will be the same as each other.

At location C, the second navigation device transmission signal will be largest.

The UAM mounting device receives the navigation device transmission signal to track the round-trip flight path (forward and reverse directions).

A past/present/future flight path may be tracked from transmission signal magnitudes and DDMs, and navigation device ID information (navigation device installation order, azimuth) of all navigation devices.

A method for calculating real-time location information of the UAM includes the three following methods.

1) Calculating the real-time location information from received signal strength indicator (RSSI) measurement and DDM for each navigation device transmission signal
2) Calculating the location information by using a navigation device transmission signal magnitude DB and a DDM signal DB of an entire route
3) Calculating the location information by combining the positioning technology using the base station of the communication network (5G, etc.) and methods 1) and 2)

The present disclosure relates to a precision navigation device in the field of Urban Air Mobility (UAM), which has been actively studied recently. Currently, this field is in the early stages of research, and the present disclosure designs a UAM-dedicated navigation device by applying a basic concept of an instrument landing facility; the navigation device has proven high precision and safety in the existing aviation field, leads the international technology, and enables International standardization of the UAM navigation device.

Further, highly precise and safe signal transmission is enabled in the UAM-dedicated navigation device to contribute to the commercialization of UAM services.

Hereinafter, in FIG. 9, a work flow for designing the precision navigation device 100 for a UAM route according to embodiments of the present disclosure will be described in detail.

Figure 9:
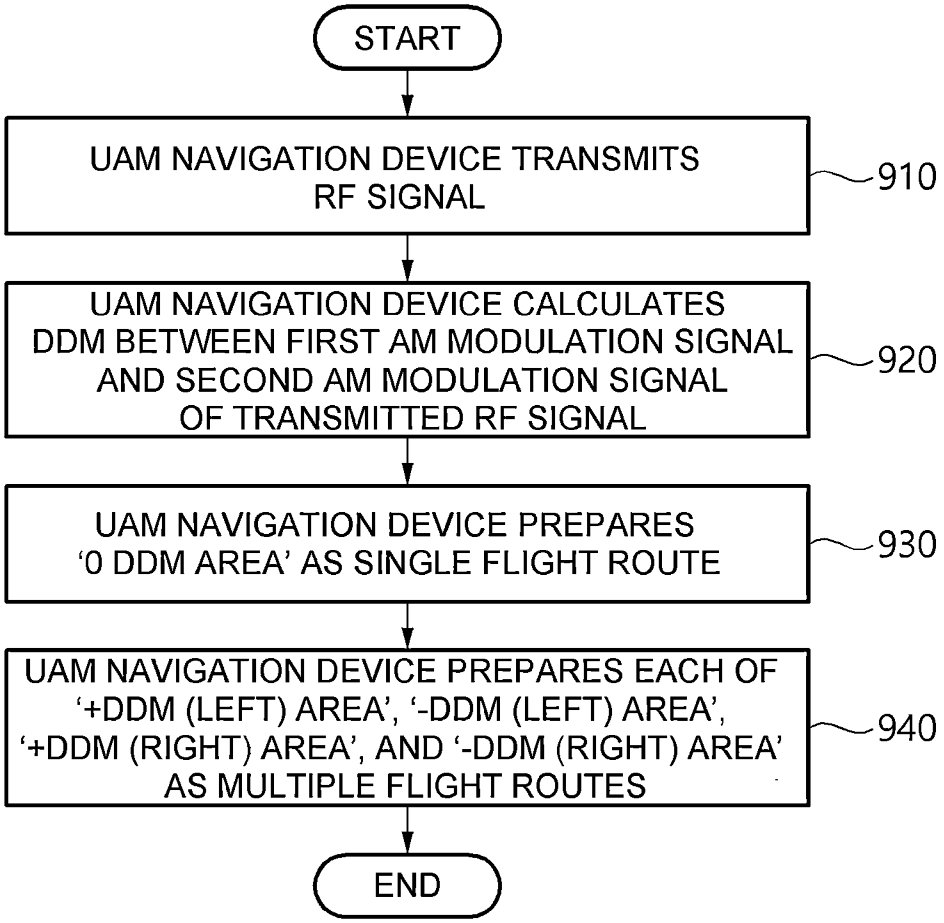
FIG. 9 is a flowchart illustrating an operation method of a precision navigation device for a UAM route according to an embodiment of the present disclosure.

FIG. 9 is a flowchart illustrating an operation method of a precision navigation device for a UAM route according to an embodiment of the present disclosure.

The operation method of a precision navigation device for a UAM route according to the embodiment may be performed by the precision navigation device 100 for a UAM route.

First, the precision navigation device 100 for a UAM route may be composed of one set of left and right sides based on a defined route of the UAM. In other words, the UAM navigation device may be composed of a set of a left navigation device F1*a* and a right navigation device F1*b* that are placed to be spaced on both left and right sides based on the center of a predetermined skyway.

A UAM navigation device of the precision navigation device 100 for a UAM route may generate a straight flight path including an altitude in the sky using a radio signal.

The UAM navigation device of the precision navigation device 100 for a UAM route transmits radio signals in the left navigation device F1*a* and the right navigation device F1*b* (910).

The left and right navigation devices of the UAM navigation device may independently transmit a carrier frequency, a first AM modulation signal, and a second AM modulation signal.

Each of the left and right navigation devices calculates a difference in depth of modulation (DDM) between the first AM modulation signal and the second AM modulation signal (920) to generate a flight path including the altitude at which the UAM flies.

Steps 910 and 920 may be a process of generating a flight path as a UAM flight path by utilizing a technology of an instrument landing system (ILS), which is proven to be precise and safe.

The UAM navigation device may radiate RF signals which are radio signals, into the air, including AM modulation signals, through a plurality of antennas, respectively, and may compare magnitudes (absolute values) of the respective radiated AM modulation signals, and calculate a difference value as the DDM.

The UAM navigation device may be constituted by the left navigation device F1*a* and the right navigation device F1*b* as a set. That is, the UAM navigation device may be constituted by a set of navigation devices that transmit the radio signals on left and right sides separated by a predetermined distance, respectively.

The set constituted by the left navigation device F1*a* and the right navigation device F1*b*, is connected in succession to generate a long-distance flight path on which the UAM flies.

In generating the flight path, the UAM navigation device may determine an intersection point of a '0' DDM area calculated by the left navigation device F1*a* and a '0' DDM area calculated by the right navigation device F1*b* as a navigation signal center line, and generate a single flight path by using the navigation signal center line as the flight path (930).

For example, in FIG. 2C, it is illustrated that the intersection point between the '0 DDM area' calculated by the left navigation device F1*a* and the '0 DDM area' calculated by the right navigation device F1*b* is set as the navigation signal center line, and which is generated as the single flight path.

In transmitting the radio signals, the UAM navigation device may transmit the radio signal within 90 degrees for a vertical pattern (a direction perpendicular to the ground) and in the range of 0 to 180 degrees or −90 to +90 degrees for a horizontal pattern (a direction parallel to the ground) at locations where the left and right navigation devices are installed.

In other words, the UAM navigation device radiates the first AM modulation signal from one antenna to an aerial area within a width of 90 degrees, and combines the aerial area within the width of 90 degrees with another aerial area within a width of 90 degrees associated with the second AM modulation signal radiated from another antenna to transmit the radio signal across a total width of 180 degrees.

Through this, the UAM navigation device may generate an area in which the DDM calculated by the carrier, the first AM modulation signal, and the second AM modulation signal transmitted by the left navigation device is '0', and an area in which the DDM calculated by the carrier, the first AM modulation signal, and the second AM modulation signal transmitted by the right navigation device is '0', and set the intersection point of the '0' DDM areas generated by the left and right navigation devices, respectively as the single flight path.

Further, the precision navigation device 100 for a UAM route variously calculates the DDM as a non-zero value to generate multiple flight paths (940).

The left navigation device F1*a* may determine a '+DDM (left) area' and a '−DDM (left) area' spaced vertically from the navigation signal center line by a predetermined value.

For example, the left navigation device F1*a* may determine a '+0.150 DDM (left) area' spaced high vertically from the navigation signal center line which is the '0 DDM area' and a '−0.150 DDM (left) area' spaced low vertically from the navigation signal center line which is the '0 DDM area'.

The right navigation device F1*b* may determine a '+DDM (right) area' and a '−DDM (right) area' spaced vertically from the navigation signal center line by a predetermined value.

For example, the right navigation device F1*b* may determine a '+0.150 DDM (right) area' spaced high vertically and a '−0.150 DDM (right) area' spaced low vertically from the navigation signal center line which is the '0 DDM area'.

The UAM navigation device may generate the multiple flight paths by setting each of the '+DDM (left) area', the '−DDM (left) area', the '+DDM (right) area', and the '−DDM (right) area' as the flight path.

For the above-mentioned examples, the UAM navigation device may generate four calculated areas (the '+0.150 DDM (left) area', the '−0.150 DDM (left) area', the '+0.150 DDM (right) area', and the '−0.150 DDM (right) area' as multiple flight paths on which the UAM may fly.

In some embodiments, the precision navigation device 100 for a UAM route may identify the UAM on a virtual plane constituted by the multiple flight paths, and confirm a current location of the UAM through identified coordinates.

To this end, the UAM navigation device may generate the '+DDM (left) area', the '−DDM (left) area', the '+DDM (right) area', and the '−DDM (right) area'. Thereafter, the UAM mounting device mounted on a UAM aircraft confirms current coordinates of the UAM from navigation signals of the '+DDM (left) area', the '−DDM (left) area', the '+DDM (right) area', and the '−DDM (right) area' generated by the UAM navigation device to confirm a degree at which the UAM deviates from the navigation signal center line.

In the above examples, on a virtual plane surrounded by four areas ('+0.150 DDM (left) area', '−0.150 DDM (left) area', '+0.150 DDM (right) area', and '−0.150 DDM (right) area'), the UAM mounting device identifies UAM coordinates [(+0.100 DDM (left), −0.100 DDM (right)] to confirm the current location of the UAM, and confirm a degree ($=\sqrt{((0.01)^2+(0.01)^2)}$) at which the UAM deviates from the navigation signal center line numerically.

The precision navigation device 100 for a UAM route may determine the location of the UAM from the DDM of the radio signals transmitted by the left and right navigation devices.

In some embodiments, the UAM navigation device may adjust or change a pre-generated flight path according to a surrounding environment.

To this end, the UAM navigation device adjusts transmitted electric power to vary a navigation device operation area (1 to 10 km) and vary a frequency bandwidth (channel) through which the radio signal is transmitted, and as the number of sets increases with the increase in entire route, the frequency bandwidth (channel) may increase proportionally.

That is, the UAM navigation device changes the transmitted electric power output from each antenna, and changes the '0' DDM areas generated by the left and right navigation devices to adjust the flight path in a specific direction.

In addition, in connecting the plurality of sets constituted by the left navigation device F1*a* and the right navigation device F1*b* in succession to generate the long-distance flight path, the UAM navigation device may support to generate the long-distance flight path adjusted in various directions by increasing the size of the frequency bandwidth (channel) in proportion to the number of connected sets.

The UAM mounting device 120 may provide flight information such as UAM location information, information of the UAM navigation device, UAM aircraft information, etc., to a UAM pilot and a ground operator in real time. The UAM mounting device may extract current location information from the navigation signal of the UAM navigation device, and display the flight path on a cockpit instrument panel inside the UAM.

To this end, the UAM navigation device transmits a unique ID indicated in the order of route, navigation device sequence, and azimuth information, thereby enabling the UAM mounting device to receive route information on the route on which the UAM is currently flying.

For example, the UAM navigation device transmits a unique ID 'AA180' to the UAM to provide information that the UAM passes through an A-th navigation device on route A, and the UAM flies in an azimuth of 180 degrees.

Further, the UAM mounting device of the precision navigation device 100 for a UAM route may identify an interaction point on the instrument panel, where a signal component of a left radio signal transmitted by the left UAM navigation device at the left side and a signal component of the right radio signal transmitted by the right UAM navigation device at the right side meet as the current location of the UAM.

Further, the UAM mounting device of the precision navigation device 100 for a UAM route may confirm a degree at which the UAM is separated from the route according to a state in which the intersection point is separated up, down, left, and right at the center of the instrument panel.

The UAM mounting device of the precision navigation device 100 for a UAM route may include an instrument panel that is mounted on the UAM and displays the generated flight path. In other words, the UAM mounting device may serve to display the generated flight path on the instrument panel included in the UAM.

On the instrument panel, a point where the radio signal received from the left navigation device and the radio signal received from the right navigation device overlap may be expressed as the current location of the UAM. In other words, the UAM mounting device may output the current location of the UAM flying along the navigation signal center line, which is the point where the radio signals overlap, through the instrument panel.

According to an embodiment of the present disclosure, a precision navigation device for a UAM route, and an operation method of the precision navigation device can be provided, which include an implementation technology for the precision navigation device for a UAM route aimed at high precision and safety.

Further, according to the present disclosure, a precision navigation device for a UAM route is installed on the ground and transmits a specific signal to provide an accurate flight path and distance information to the UAM.

In addition, according to the present disclosure, a UAM dedicated navigation system can be developed by applying a basic concept of an instrument landing system (ILS) which is a navigation device which is installed in an existing airport and proven to be reliable and precise.

The operation method of the precision navigation device for a UAM route according to the embodiment may be implemented in a form of a program command which may be performed through various computer means and recorded in the computer readable medium. The computer readable medium may include a program command, a data file, a data structure, etc., singly or combinationally. The program command recorded in the medium may be specially designed and configured for the exemplary embodiment, or may be publicly known to and used by those skilled in the computer software field. An example of the computer readable recording medium includes magnetic media, such as a hard disk, a floppy disk, and a magnetic tape, optical media such as a CD-ROM and a DVD, magneto-optical media such as a floptical disk, and hardware devices such as a ROM, a RAM, and a flash memory, which are specially configured to store and execute the program command. An example of the program command includes a high-level language code executable by a computer by using an interpreter and the like, as well as a machine language code created by a compiler. The hardware device may be configured to be operated with one or more software modules in order to perform the operation of the exemplary embodiment and vice versa.

The software may include a computer program, code, instructions, or a combination of one or more thereof, and configure the processing unit to operate as desired, or instruct a processing device independently or collectively. Software and/or data may be interpreted by the processing device or may be permanently or temporarily embodied in any type of machine, component, physical device, virtual equipment, computer storage medium or device, or a transmitted signal wave in order to provide instructions or data to the processing device. The software may be distributed on a computer system connected through the network and stored or executed by the operation method of the precision navigation device for a UAM route, which is distributed. The software and the data may be stored in one or more computer readable recording media.

As described above, although the embodiments have been described by the limited drawings, those skilled in the art can apply various technical modifications and variations based on the above. For example, the described techniques are performed in a different order from the described operation method of the precision navigation device for a UAM route, and/or components such as a system, structure, device, circuit, etc., described are collected or combined in a form different from the described operation method of the precision navigation device for a UAM route, or even if the components are replaced or substituted by other components or an equivalent, an appropriate result can be achieved.

Therefore, other implementations, other embodiments and claims and equivalents fall within the scope of the following claims.

| [DESCRIPTION OF REFERENCE NUMERALS] | |
|---|---|
| 100: precision navigation device for UAM route | |
| 110: UAM navigation device | 120: UAM mounting device |
| F1a: left navigation device | F1b: right navigation device |

What is claimed is:

1. A precision navigation device for an urban air mobility (UAM) route, comprising:

a UAM navigation device constituted by one set of left and right navigation devices based on a defined route of a UAM, and generating a straight flight path including an altitude in the sky by using radio signals; and a UAM mounting device identifying an interaction point on an instrument panel, where a signal component of a left radio signal transmitted by the left UAM navigation device at a left side and a signal component of the right radio signal transmitted by the right UAM navigation device at the right side meet as a current location of the UAM, and transmitting the generated flight path to an external device to control the UAM, wherein the UAM navigation device calculates a difference in depth of modulation (DDM) between a first AM modulation signal and a second AM modulation signal of the radio signal to generate the straight flight path, wherein the UAM navigation device determines an intersection point between a '0 DDM area' calculated by the left navigation device and a '0 DDM area' calculated by the right navigation device as a navigation signal center line, and generates the navigation signal center line as a single flight path as the straight flight path, wherein the UAM navigation device generates multiple flight paths by setting each of a '+DDM (left) area' and a '−DDM (left) area' calculated by the left navigation device and a '+DDM (right) area' and a '−DDM (right) area' calculated by the right navigation device as the straight flight path, the left navigation device calculates the '+DDM (left) area' and the '−DDM (left) area' spaced vertically or horizontally from the navigation signal center line by a predetermined value, and the right navigation device calculates the '+DDM (right) area' and the '−DDM (right) area' spaced vertically or horizontally from the navigation signal center line by a predetermined value, wherein the UAM navigation device adjusts transmitted electric power to vary a navigation device operation area and vary a frequency bandwidth (channel) in which the radio signal is transmitted, and as a number of sets increases, the frequency bandwidth (channel) increases proportionally, wherein the UAM navigation device includes a plurality of antennas, radiates radio frequency (RF) signals into the air, including the first AM modulation signal and the second AM modulation signal, through the plurality of antennas, respectively, compare absolute values of the respective radiated RF signals, and calculate a difference value as the DDM, and wherein the UAM navigation device changes the transmitted electric power, which is outputted from each antenna of the plurality of antennas, and changes the '0 DDM area' calculated by the left navigation device and the '0 DDM area' calculated by the right navigation device, to adjust the flight path in a specific direction.

2. The precision navigation device according to claim 1, wherein the UAM mounting device confirms a degree at which the UAM is separated from the route according to a state in which an intersection point is separated up, down, left, and right at a center of the instrument panel.

3. The precision navigation device according to claim 1, wherein the UAM mounting device confirms current coordinates of the UAM from navigation signals of the '+DDM (left) area', the '−DDM (left) area', the '+DDM (right) area', and the '−DDM (right) area' generated by the UAM navigation device to confirm a degree at which the UAM deviates from the navigation signal center line.

4. The precision navigation device according to claim 1, wherein the UAM navigation device transmits a unique identification (ID) indicated in an order of route, navigation device sequence, and azimuth information, thereby enabling the UAM mounting device to receive route information on the route on which the UAM is currently flying.

5. An operation method of a precision navigation device for an urban air mobility (UAM) route, comprising:

generating, by a UAM navigation device constituted by one set of left and right navigation devices based on a defined route of a UAM, a straight flight path including an altitude in the sky by using radio signals;

identifying, by a UAM mounting device, an interaction point on an instrument panel, where a signal component of a left radio signal transmitted by the left UAM navigation device at a left side and a signal component of the right radio signal transmitted by the right UAM navigation device at the right side meet as a current location of the UAM, and transmitting the generated flight path to an external device to control the UAM;

calculating, by the UAM navigation device, a difference in depth of modulation (DDM) between a first AM modulation signal and a second AM modulation signal of the radio signal to generate the straight flight path;

determining, by the UAM navigation device, an intersection point between a '0 DDM area' calculated by the left navigation device and a '0 DDM area' calculated by the right navigation device as a navigation signal center line;

generating, by the UAM navigation device, the navigation signal center line as a single flight path as the straight flight path;

generating, by the UAM navigation device, multiple flight paths by setting each of a '+DDM (left) area' and a '−DDM (left) area' calculated by the left navigation device and a '+DDM (right) area' and a '−DDM (right) area' calculated by the right navigation device as the straight flight path, wherein the left navigation device calculates the '+DDM (left) area' and the '−DDM (left) area' spaced vertically or horizontally from the navigation signal center line by a predetermined value, and the right navigation device calculates the '+DDM (right) area' and the '−DDM (right) area' spaced vertically or horizontally from the navigation signal center line by a predetermined value;

varying, by the UAM navigation device, a navigation device operation area by adjusting transmitted electric power;

varying, by the UAM navigation device, a frequency bandwidth (channel) in which the radio signal is transmitted;

proportionally increasing, by the UAM navigation device, the frequency bandwidth (channel) as a number of sets increases;

radiating, through a plurality of antennas of the UAM navigation device, radio frequency RF) signals into the air, including the first AM modulation signal and the second AM modulation signal respectively, comparing, by the UAM navigation device, absolute values of the respective radiated RF signals, and calculating, by the UAM navigation device, a difference value as the DDM; and changing, by the UAM navigation device, the transmitted electric power, which is outputted from each antenna of the plurality of antennas, and changing, by the UAM navigation device, the '0 DDM area' calculated by the left navigation device and the '0 DDM area' calculated by the right navigation device, to adjust the flight path in a specific direction.

6. The operation method according to claim 5, further comprising:

confirming, by the UAM mounting device, a degree at which the UAM is separated from the route according to a state in which an intersection point is separated up, down, left, and right at a center of the instrument panel.

7. The operation method according to claim 5, further comprising:

confirming, by the UAM mounting device, current coordinates of the UAM from navigation signals of the '+DDM (left) area', the '−DDM (left) area', the '+DDM (right) area', and the '−DDM (right) area' generated by the UAM navigation device to confirm a degree at which the UAM deviates from the navigation signal center line.

8. The operation method according to claim 5, further comprising:

transmitting, by the UAM navigation device, a unique identification (ID) indicated in an order of route, navigation device sequence, and azimuth information, thereby enabling the UAM mounting device to receive route information on the route on which the UAM is currently flying.

9. A non-transitory computer-readable recording medium having a program for executing the method according to claim 5, which is recorded therein.

* * * * *